Patented Apr. 14, 1931

1,800,834

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

METHOD OF REFINING ROSIN

No Drawing. Application filed August 23, 1926, Serial No. 131,123. Renewed August 15, 1928.

My invention relates to a process of treating rosin, both wood rosin, which, while marketable, is of a low grade, and the lower grades of gum rosin, so as to remove therefrom practically all of the objectionable coloring matter and produce a high grade rosin adapted for use in sizing the higher grades of paper and in the manufacture of the better grades of varnish and which is so thoroughly purified and refined that it is adapted for use in the manufacture of high grade rosin soaps and limed varnishes of satisfactory color, as well as for most, if not all, other purposes to which the high grade gum rosin is adapted.

The rosin to be purified by my process may be produced as such from either wood or gum rosins by any of the usual and well known processes, or it may be purified as found in "drop liquor", which, as is well known, is produced by flooding wood stock, from which turpentine has been removed by steam, with gasoline, and which contains chiefly rosin, pine oil and various coloring bodies.

In carrying out the process embodying my invention, the rosin, especially wood rosin, may be subjected to any desired preliminary distillation process, or the rosin may be distilled after subjecting it to my refining process, but such is not usually necessary and is preferably omitted.

Now in accordance with my invention the rosin to be purified, in solution in a suitable solvent, is treated for the extraction of color bodies with a phenol, for example ordinary phenol ($C_6H_5OH$), which though it has a melting point of about 40° C. may be rendered liquid by the addition of a small amount of water, it having been discovered by me that phenol has the capacity for selectively dissolving out the color bodies from rosin.

Typical of the practice of my invention using ordinary phenol ($C_6H_5OH$), as the purifying agent, the following treatment of wood rosin will be illustrative:—

Wood rosin, produced by any of the known processes, is dissolved in a suitable solvent, for example, gasoline, to form a rosin solution containing say about 15%, by weight, of rosin to which is added phenol. For example, say 800 g. of gasoline-rosin solution, containing 15% rosin is extracted with a mixture of 250 g. of phenol and 40 g. of water.

The rosin solution and phenol and water should be thoroughly mixed and then allowed to separate into two layers, one of which is primarily phenol, water and extracted color bodies, with a small proportion of the rosin, and the other of which is primarily gasoline and purified rosin, with a small amount of phenol. The phenol is somewhat soluble in the gasoline-rosin solution at certain temperatures, its solubility decreasing with reduction of temperature below normal atmospheric temperatures. Therefore, separation may be facilitated and made more complete by effecting the separation into layers at a reduced temperature, say a temperature of about 7° C.

The gasoline-rosin solution is separated from the phenol solution by any convenient method, as by gravity or centrifugal force. Since the phenol is to some extent soluble in the gasoline at the suggested temperature of 7° C. the gasoline-rosin solution is preferably washed with water or dilute aqueous alkali solution in order to remove from it the small amount of phenol which it contains. The purified rosin may now be recovered from the gasoline-rosin solution through removal of the gasoline by, for example, distillation, with or without direct steam, the gasoline being recovered for reuse.

The refined rosin obtained by the method as illustrated above, amounts to 52% of the original rosin, will grade K in color and will give a soap which will show practically no discoloration on aging.

The phenol has some solvent power on rosin, hence the separated phenol contains some rosin in addition to the color bodies, as has been indicated, which rosin may be recovered as low grade rosin by distilling off the phenol, or as a higher grade rosin by extracting the solution with gasoline. The recovered rosin may be refined by dissolving in gasoline and extracting with phenol as described above, thus converting a portion of it into high grade rosin.

The process embodying my invention may be applied to the refining or purifying of low grade gum rosins for the production of high grade gum rosins and may likewise be applied to the refining of wood rosin and of rosin as contained in "drop liquor" where the concentration of rosin in the drop liquor is not too high, the best results being obtainable where the concentration of rosin is not over about 8%.

In carrying out the process according to my invention the phenol may, if desired, be caused to go into solution in the rosin solvent and a homogeneous solution of rosin, solvent and phenol formed, it being only necessary to have the mixture of rosin, solvent and phenol at a temperature at which the phenol will dissolve in the rosin-solution, separation of the phenol and color bodies from the rosin solution being effected after a reduction of the temperature of the solution to a point where the major portion of the phenol will be insoluble in the rosin solvent and hence will be thrown out of solution along with the color bodies and a small proportion of the rosin.

The preferred solvent for the rosin is the gasoline cut of petroleum, but it will be understood that any light petroleum distillate may be used as the rosin solvent, unless its boiling range is above that of kerosene, and it is my intention that, where in the claims appended hereto gasoline is specified, the use, as a solvent for the rosin of any operative equivalent for gasoline which is substantially immiscible with phenol, shall be included as an equivalent of gasoline.

Having now fully described my invention, what I claim and desire to protect by Letters Patent is:—

1. The method of refining rosin, which includes dissolving rosin in a solvent normally substantially immiscible with phenol, treating the rosin solution with phenol for the extraction of color bodies from the rosin, separating phenol and color bodies from the rosin solution and recovering refined rosin from the rosin solution.

2. The method of refining rosin, which includes dissolving rosin in a solvent, treating the rosin solution with a phenol normally substantially immiscible with the solvent for the rosin for the extraction of color bodies from the rosin, separating phenol and color bodies from the rosin solution and recovering refined rosin from the rosin solution.

3. The method of refining rosin, which includes dissolving rosin in a solvent normally substantially immiscible with phenol, treating the rosin solution with phenol for the extraction of color bodies from the rosin, reducing the temperature of the rosin solution, separating phenol and color bodies from the rosin solution and recovering refined rosin from the rosin solution.

4. The method of refining rosin, which includes dissolving rosin in gasoline, treating the gasoline-rosin solution with phenol for the extraction of color bodies from the rosin, separating phenol and color bodies from the gasoline-rosin solution and recovering refined rosin from the gasoline-rosin solution.

5. The method of refining rosin, which includes dissolving rosin in gasoline, treating the gasoline-rosin solution with phenol for the extraction of color bodies from the rosin, reducing the temperature of the rosin solution, separating phenol and color bodies from the gasoline-rosin solution and recovering refined rosin from the gasoline-rosin solution.

6. In the method of refining rosin the step which includes subjecting rosin in solution to treatment with phenol.

7. In the method of refining rosin the step which includes subjecting rosin in solution in a suitable petroleum hydrocarbon to treatment with phenol.

8. The method of refining rosin, which includes dissolving rosin in a suitable solvent, treating the rosin solution with a phenol capable of substantial immiscibility with the rosin solution and of extracting color bodies from the rosin solution, separating the phenol and color bodies from the rosin solution and recovering refined rosin from the rosin solution.

9. The method of refining rosin, which includes dissolving rosin in a suitable petroleum hydrocarbon, treating the rosin solution with a phenol capable of substantial immiscibility with the rosin solution and of extracting color bodies from the rosin solution, separating the phenol and color bodies from the rosin solution and recovering refined rosin from the rosin solution.

10. The method of refining rosin, which includes dissolving rosin in a suitable solvent, intimately contacting with the rosin solution a phenol capable of substantial immiscibility with the rosin solution and of extracting color bodies from the rosin solution, separating the phenol and color bodies from the rosin solution and recovering refined rosin from the rosin solution.

11. The method of refining rosin, which includes dissolving rosin in a suitable solvent, intimately contacting with the rosin solution a phenol capable of substantial immiscibility with the rosin solution and of extracting color bodies from the rosin solution, cooling the mixture, separating the phenol and color bodies from the rosin solution and recovering refined rosin from the rosin solution.

12. The method of refining rosin, which includes dissolving rosin in a suitable solvent, intimately contacting phenol with the rosin solution for the extraction of color bodies from the rosin solution, separating the phenol and color bodies from the rosin solution and recovering refined rosin from the rosin solution.

13. The method of refining rosin, which includes dissolving rosin in a suitable solvent, intimately contacting phenol with the rosin solution for the extraction of color bodies from the rosin solution, cooling the mixture, separating the phenol and color bodies from the rosin solution and recovering refined rosin from the rosin solution.

14. The method of refining rosin, which includes dissolving rosin in a suitable solvent, intimately contacting with the rosin solution a phenol normally substantially immiscible with the rosin solution and capable of extracting color bodies from the rosin, separating at least a major portion of the phenol and color bodies from the rosin solution and recovering refined rosin from the rosin solution.

15. The method of refining rosin, which includes dissolving rosin in a suitable solvent, intimately contacting with the rosin solution a phenol normally substantially immiscible with the rosin solution and capable of extracting color bodies from the rosin, cooling the mixture, separating at least a major portion of the phenol and color bodies from the rosin solution and recovering refined rosin from the rosin solution.

In testimony of which invention, I have hereunto set my hand, at Kenvil, N. J., on this 12th day of August, 1926.

IRVIN W. HUMPHREY.